United States Patent [19]

Smith

[11] 4,403,090

[45] Sep. 6, 1983

[54] POLYISOPHTHALATES AND COPOLYMERS THEREOF HAVING HIGH BARRIER PROPERTIES

[75] Inventor: Richard R. Smith, Cuyahoga Falls, Ohio

[73] Assignee: The Goodyear Tire & Rubber Company, Akron, Ohio

[21] Appl. No.: 415,210

[22] Filed: Sep. 7, 1982

[51] Int. Cl.³ .................. C08G 63/02; C08G 63/16
[52] U.S. Cl. ........................ 528/272; 528/295.3; 528/295.5; 528/302; 528/308.6
[58] Field of Search ........... 528/272, 309, 302, 295.3, 528/295.5, 308.6

[56] References Cited

U.S. PATENT DOCUMENTS

| | | | |
|---|---|---|---|
| 4,045,431 | 8/1977 | Fagerburg | 528/295.3 |
| 4,049,631 | 9/1977 | Go | 528/272 X |
| 4,145,517 | 3/1979 | Go | 528/272 X |
| 4,154,920 | 5/1979 | Jabarin | 528/272 |
| 4,340,721 | 7/1982 | Bonnebat et al. | 528/272 |

*Primary Examiner*—Lucille M. Phynes
*Attorney, Agent, or Firm*—Daniel J. Hudak; Bruce J. Hendricks

[57] ABSTRACT

Polyisophthalates, for example, poly(ethylene isophthalate), or copolymers thereof, have low glass transition temperatures, even lower than poly (ethylene terephthalate). Unexpectedly, such polyisophthalates have very good barrier properties with regard to oxygen and carbon dioxide penetration. The polyisophthalates can be utilized as packaging materials, for example as films or containers such as bottles for beverages such as intoxicating beverages such as beer, and the like.

26 Claims, No Drawings

POLYISOPHTHALATES AND COPOLYMERS THEREOF HAVING HIGH BARRIER PROPERTIES

TECHNICAL FIELD

The present invention relates to polyisophthalates such as poly(ethylene isophthalate) and copolymers thereof, and their use as packaging materials, for example, as containers or films, or molded containers made therefrom.

BACKGROUND ART

In recent years, much activity and invention in the art of polyesters has centered around the development of articles made from poly(ethylene terephthalate) (PET), and to a lesser extent, poly(butylene terephthalate). Containers constructed of PET have recently found wide acceptance in the packaging of food stuffs, medicines, and consumer products.

Despite the popularity of PET in container manufacture, there are several drawbacks to the use of PET. Although PET is considered a high barrier polymer, the use of PET containers for beer has heretofore been avoided due to the rapidity with which beer loses its flavor, due largely to oxygen migration into the bottle. Further, because of the high processing temperatures involved in the manufacture of PET bottles, a significant amount of acetaldehyde by-product is formed during extrusion and molding. This compound, at relatively low concentrations, readily imparts an undesirable or bad after taste to many food stuffs packaged in PET.

U.S. Pat. Nos. 4,049,631; 4,098,769; and 4,110,315 all to Santos Go, relate to copolyesters containing sulfone units therein and having a glass transition temperature of 75° C. or higher. Unoriented poly(ethylene terephthalate) generally has a glass transition temperature of about 72° C. Although the copolyesters of Go tend to have lower oxygen and carbon dioxide permeabilities than pure poly(ethylene terephthalate), they also give higher glass transition temperatures, ostensibly for the purpose of producing materials which can be subjected to higher temperatures than that of pure PET.

U.S. Pat. No. 4,145,517 also to Santos Go, relates to copolymers of polyesters also containing sulfone units therein. The product of this patent is used for developing various items such as packaging for food stuff, molded containers for carbonated beverages, medicine bottles, and the like. Due to the use of the particular type of sulfone, the copolymer has a very high glass transition temperature, that is at least 121° C. Accordingly, the copolyester exhibits improved properties as well as good heat stability. Additionally, there is somewhat of an improvement with regard to oxygen and carbon dioxide permeability resistance.

The Kirk-Othmer Encyclopedia of Chemical Technology, Third Edition, 1978, Volume 3, at page 480, states that with regard to factors affecting barrier properties, a truly good barrier polymer must have some degree of polarity such as contributed by nitrile, etc. groups, high chain stiffness, inertness, close chain-to-chain packing, order, crystaliinity or orientation, some bonding or attraction between the chains, and high glass transition temperatures. At page 487, it is noted that the permeation of carbon dioxide is an important factor in defining a high barrier polymer, especially for use with carbonated beverages since carbon dioxide permeation rates are three to four times that of oxygen in almost all polymers.

At page 489, it is stated that major use of high barrier polymers is packaging, especially food and beverages, as replacement for glass or metal containers. It is then stated at the bottom of page 489 as well as on page 490 that many foods are very sensitive to oxidation which cause flavor changes or discoloration. Moreover, it is noted that loss of 10 percent or more of carbonation can be easily detected by taste and that beer flavor is affected by oxygen levels of less than 2 parts per million.

U.S. Pat. No. 2,965,613 to Milone relates to copolymers of ethylene terephthalate and ethylene isophthalate and is not pertinent because it does not relate to high barrier packaging materials with respect to oxygen or carbon dioxide, or to lower acetaldehyde production.

U.S. Pat. No. 4,234,708 relates to extrusion grade polyethylene iso/terephthalate copolymers having less than 15 percent by weight of isophthalic acid and hence does not have low glass transition temperatures, or the like.

U.S. Pat. No. 3,733,309 relates to biaxially molded poly(ethylene terephthalate) with regard to making containers.

From the above prior art patents and article, it can be seen that there is a relationship in polymers between the permeability resistance and higher glass transition temperatures. Accordingly, it was totally unexpected that the use of a polyester compound having a low glass transition temperature such as certain polyisophthalates, e.g., poly(ethylene isophthalate), and copolymers thereof would have large increases in resistance to oxygen and carbon dioxide penetration. Moreover, the polyisophthalates or copolymers of the present invention process at lower temperatures and thus generate reduced amounts of various undesirable by-products such as acetaldehyde which imparts undesirable taste to various items such as carbonated beverages contained by the polymer.

DISCLOSURE OF INVENTION

It is therefore an aspect of the present invention to provide packaging materials (e.g., containers, films, etc.) constructed of polyisophthalates (PI), or copolymers thereof, having good barrier properties.

It is another aspect of the present invention to provide backaging materials constructed of PI and copolymers thereof, as above, having a glass transition temperature which is lower than PET.

It is yet another aspect of the present invention to provide packaging materials constructed of PI and copolymers thereof, as above, wherein said material can be used in making a molded container.

It is yet another aspect of the present invention to provide packaging materials constructed of PI and copolymers thereof, having lower by-product formation, e.g., acetaldehyde, during manufacture.

It is still another aspect of the present invention to provide packaging materials constructed of PI and copolymers thereof, as above, which require less energy during processing to make.

A still further aspect of the instant invention is to provide packaging materials constructed of PI and copolymers thereof, as above, which have physical properties similar to PET.

A still further aspect of the present invention is to provide packaging materials constructed of PI and copolymers thereof, as above, which have lower permeability properties than PET.

A still further aspect of the present invention is to provide packaging materials contructed of PI and copolymers thereof, in the form of molded containers, for example, bottles, and especially beverage bottles for containing beer, wine, liquor, and other alcoholic beverages.

These and other aspects of the present invention will become apparent from the following description which sets forth the best mode and the preferred embodiments of the invention.

In general, as a composition of matter, a polyester suitable for use as a packaging material, comprises: polyisophthalates or copolymers thereof having a glass transition temperature of 70° C. or less; said polyisophthalates being the reaction product of an isophthalic compound and a diol having from 2 to 12 carbon atoms, said isophthalic compound selected from the group consisting of isophthalic acid, and an alkyl ester of isophthalic acid having from 10 to 20 carbon atoms, said diol being ethylene glycol and containing from 0 to 60 mole percent of one or more compounds selected from the group consisting of a diol having from 3 to 12 carbon atoms, a glycol ether having from 4 to 12 carbon atoms, and combinations thereof; said copolymer being the reaction product of said isophthalic compound, said diol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound.

In general, a molded container formed from materials which comprise polyisophthalates or copolymers thereof, said polyisophthalates being the reaction product of an isophthalic compound, and a diol having from 2 to 12 carbon atoms, said isophthalic compound selected from the group consisting of isophthalic acid, and an an alkyl ester of isophthalic acid containing from 10 to 20 carbon atoms, said diol being ethylene glycol and containing from 0 to 60 mole percent of one or more compounds selected from the group consisting of a diol having from 3 to 12 carbon atoms, a glycol ether having from 4 to 12 carbon atoms, and combinations thereof, said copolymer additionally including up to 50 mole percent of a dicarboxylic acid or ester thereof having from 4 to 40 carbon atoms, based upon said isophthalic compound and said dicarboxylic acid or ester thereof, said dicarboxylic acid or ester thereof being other than said isophthalic compound.

BEST MODE FOR CARRYING OUT THE INVENTION

The present invention relates to providing polyesters which form packing materials or molded containers having very good barrier properties with regard to oxygen and carbon dioxide and yet unexpectedly have low glass transition temperatures, even lower than poly(ethylene terephthalate). The polyesters utilized are produced by the reaction of an isophthalic compound, that is isophthalic acid or substituted isophthalic acid or esters of isophthalic acid with diols, for example, ethylene glycol and optionally up to about 60 mole percent of a diol containing from 3 to 20 carbon atoms. Hence, such a compound is referred to as a polyisophthalate. Isophthalic acid is highly preferred. The alkyl esters of isophthalic acid generally contain a total of from 10 to 20 carbon atoms, with from 10 to 16 carbon atoms being preferred. Specific examples of diesters of isophthalic acid include dimethylisophthalate and diethylisophthalate which are preferred.

Preferably, ethylene glycol is utilized so that the end polymer is poly(ethylene isophthalate) (PEI), a preferred polymer. However, as noted, up to about 60 mole percent of one or more diols having from 3 to 12 carbon atoms can be utilized, so that polyisophthalates (PI) are formed. Due to the tendency of long chain glycols or diols to reduce the barrier resistance with regard to oxygen and carbon dioxide, it is desired that glycols containing 10 carbon atoms or less and preferably glycols containing a total of 8 carbon atoms or less, especially aliphatic or cycloaliphatic glycols, be utilized. Examples of diols include propylene glycol such as trimethylene glycol, 1,2-butane diol, 1,3-butane diol, 1,4-butane diol, neopentyl glycol, cyclohexane dimethanol, and the like. Generally, any of the glycols just noted are suitable so long as they produce a polyisophthalate having a glass transition temperature as well as oxygen permeability less than that set forth hereinbelow, that is, generally a Tg of 70° C. or less and an oxygen permeability of 8 cc·mil/100 in$^2$·day·atm or less. Generally, the amount of the non-ethylene glycol utilized is 45 mole percent or less, desirably 30 mole percent or less, and preferably 15 mole percent or less. Examples of such preferred diols include cyclohexanedimethanol, tetramethylene glycol, and propylene glycol.

Another class of diols include the glycol ethers which contain from 4 to 12 carbon atoms, preferably from 4 to 8 carbon atoms, with specific examples including diethylene glycol and 1,4-dihydroxyethoxy benzene.

The isophthalic compound, that is isophthalic acid, or esters thereof, which are reacted with glycols can optionally be made with up to 50 mole percent of a dicarboxylic acid or ester thereof, herein defined as a non-isophthalic compound, to form a random or block copolymer. The isophthalic compound reaction as well as the use of the optional dicarboxylic acid or ester thereof (other than an isophthalic compound) is made utilizing conventional amounts of conventional catalysts, additives, for example, colorants, chain branching agents, stabilizers, and the like.

In the present invention, whenever the term polyisophthalate is utilized, it is to be understood that the polyester is made from isophthalic acid, or esters thereof, with a diol, that is at least 40 mole percent of ethylene glycol and up to 100 percent, although the diol can contain up to 60 mole percent, of the above-noted 3 to 12 carbon atom diols. Regardless of whether a polyisophthalate polymer is made or a copolymer thereof using a non-isophthalic compound, that is a dicarboxylic acid or an ester thereof (other than of isophthalic acid or an ester thereof), generally all of the various reactants are added and made in a conventional manner. For example, all reactants are commonly added to the esterification or the transesterification stage, and followed by a polycondensation stage to produce the polyesters of the present invention. Although block copolyesters can be produced according to the present invention by conducting the non-isophthalic compound reaction separate from the isophthalic compound reaction, and then reacting the two products together in a conventional manner known to the art to obtain said block polyesters, random linear copolyesters are preferred. As also known to the art, random copolymers can be obtained even by adding the non-isophthalic compound at nearly the end of the transesterification or the esterification stage.

When a copolymer is made, the dicarboxylic acid or ester thereof has from 4 to 40 carbon atoms and which, as noted, is not an isophthalic compound or ester thereof. Thus, the dicarboxylic acid can be an alkyl dicarboxylic acid, an aryl dicarboxylic acid, an alkyl substituted aryl dicarboxylic acid, a dimer acid, or esters thereof. Alkyl dicarboxylic acids desirably contain from 4 to 12 carbon atoms. If the acids are aryl or alkyl substituted aryl acids, they desirably contain from 8 or 9, respectively, to about 16 carbon atoms. Dimer dicarboxylic acids can also be utilized. Specific examples of linear or alkyl dicarboxylic acids include glutaric acid, adipic acid, azelaic acid, sebacic acid, and the like.

The dimer acid generally has a range of from about 34 to 40 carbon atoms and preferably 36 carbon atoms. The dimer acid is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S. 66,84 (1944) and U.S. Pat. No. 2,347,562, both of which are fully incorporated herein by reference. Several different grades of dimer acid are available from commercial sources and these differ from each other primarily in the amount of the monobasic and trimer acids fractions and the degree of unsaturation. It is preferred, for purposes of this invention, that the dimer acid be substantially free of the monobasic and trimer acids fractions, that is less than 8 percent by weight, and essentially completely saturated, and be added after the transesterification reaction; that is, at the condensation stage. Two different grades of dimer acid, which are useful in preparing the copolyesters herein described and meet the above requirements are available from Emery Industries, Inc. under the trade name Empol 1010 dimer acid, typically containing 97 percent dimer acid, 3 percent trimer acid, and essentially no monobasic acids and extremely low unsaturation, and Empol 1014 typically containing 95 percent, 4 percent, and 1 percent of dimer, trimer, and monobasic acids, respectively.

Moreover, the dicarboxylic acid utilized in preparing the copolyester can be an aryl or an alkyl substituted aryl acid containing from 8 or 9, respectively, to about 16 carbon atoms. Specific examples of aryl acids include terephthalic acid, orthophthalic acid, naphthalic acid, for example, 2,6-naphthalene dicarboxylic acid, and the like. Specific examples of alkyl substituted aryl acids include the various isomers of dimethylphthalic acid such as dimethylorthophthalic acid and dimethylterephthalic acid, the various isomers of diethylphthalic acid such as diethylorthophthalic acid and diethylterephthalic acid, the various isomers of dimethylnaphthalic acid such as 3,7-dimethyl-2,6-naphthalene dicarboxylic acid and 2,5-dimethyl-1,6-naphthalene dicarboxylic acid, and the various isomers of diethylnaphthalene dicarboxylic acid, and the like. Generally, terephthalic acid is preferred.

It is well known to those skilled in the art, in lieu of the various dicarboxylic acids, the various diesters thereof can be utilized. Thus, alkyl diesters containing a total of from 6 to about 20 carbon atoms as well as alkyl substituted aryl diesters or aryl diesters containing from 11 or 10 respectively to about 20 carbon atoms can be utilized. As previously noted, esters of isophthalic acid or substituted isopthalic acid are not within the definition of an ester of a dicarboxylic acid, since they would not form a polyisophthalate copolymer. Examples of alkyl diesters include the various esters of glutaric acid, adipic acid, azelaic acid, or sebacic acid, and the like. Specific examples of various alkyl substituted aryl diesters include 3,6-dimethyldimethylterephthalate and 3,7-dimethyl-2,6-dimethylnaphthalene dicarboxylate, and examples of aryl diesters include the various isomers of dimethylphthalate such as dimethylterephthalate, a preferred compound, the various isomers of diethylphthalate, the various isomers of diethylnaphthalate, and the like.

The alkali salts of sulfo dialkyl isophthalate can also be utilized wherein said alkyl group has from 1 to 5 carbon atoms, with methyl being highly preferred. Of the various salts, sodium is preferred. Thus a preferred compound is sodium sulfo dimethyl isophthalate. These monomers, if used in sufficient quantity, tend to make the copolymer water soluble.

The amount of the dicarboxylic acid or ester thereof (non-isophthalic compound) utilized is such that the Tg of the polyisophthalates, or copolymers thereof is 70° C. or less. Such a Tg is usually obtained by using an amount of dicarboxylic acid (or ester thereof), with the isophthalic compound on a mole basis generally from about zero, that is from about 0 or from about 0.1 to about 50 mole percent. Desirably, the amount is from about 0.0 or 0.1 percent to about 20 mole percent, and preferably from about 0.0 or 0.1 percent to about 10 mole percent when an alkyl dicarboxylic acid or dimer acid is utilized. The mole percent is generally from about 0.0 or 0.1 to about 50 percent, desirably from about 0.0 or 1 to about 30 percent, and preferably from about 0.0 or 0.1 to about 20 when aryl acid, an alkyl substituted aryl acid, sulfo compounds, or diesters thereof, are utilized. Such latter type compounds are preferred in the present invention.

The total amount of diols utilized in comparison to the total amount of acids (isophthalic compound and non-isophthalic compound) are conventional. Typically, the mole ratio of the total amount of diol utilized with the total amounts of acid is approximately 1.05 to 2.5 and approximately 2.2 when esters are used in lieu of acids. Of course, much higher or lower ratios can be used as known to the art. Naturally, if the isophthalic compound is an ester and a copolymer is made, the other monomer is also preferably an ester, that is a diester of a dicarboxylic acid. When esters are used as the starting material, the polyester is therefor made using any conventional ester route as is well known to the art. If the isophthalic compound is an acid and a copolymer made, the other monomer is preferably a dicarboxylic acid (other than isophthalic acid, etc.) and the polyester is made according to any conventional non-ester route.

The polyesters can be made according to melt polymerization, or melt and solid state polymerization. As known to those skilled in the art, polyesters are generally made in two stages. In the first stage or esterification stage, the diacid is reacted with the diol at elevated temperatures and usually elevated pressures with water being removed. In the second stage or the polycondensation stage, a vacuum is gradually applied, generally catalysts are utilized, and water and a diol are withdrawn as a condensation product. Various polyesters can be made by such a polymerization including poly(ethylene isophthalate), a preferred polyester resin. Moreover, the process may be modified slightly by reacting the isophthalic acid with the diol in a solution which is a low molecular weight linear polyisophthalate in a manner as set forth in U.S. Pat. No. 4,020,049 to Rinehart, which is hereby fully incorporated with regard to the method of making the polyester resin. Another well known variation utilizes dimethyl isophthalate or other diesters which reacts with ethylene glycol in the presence of a catalyst yielding a bishydroxyethylisophthalate compound. A stabilizer may then be added as well as a catalyst and a polycondensation reaction is carried out to yield a polyester.

Solid stage polymerization can also be utilized, if fairly high crystalline polymers are made. In this process, the polycondensation is carried out in an inert atmosphere until generally the intrinsic viscosity of the polymer melt reaches about 0.20 or higher, for example, up to about 0.80. At this point, the solution melt is cooled to produce a solid which is then pelletized, chopped, etc. The pellets are then subjected to a solid state polymerization wherein the vacuum is applied at a temperature below the melting point of the partially formed polymer. Thus, the polymer is actually polymerized in a solid state, with the polycondensation reaction being continued in such a state. Generally, the solid state polymerization is continued until the intrinsic viscosity reaches any desirable level, such as from about 0.60 to about 1.0, or even higher. Desirably, the intrinsic viscosity ranges from about 0.70 to about 0.90. The units are deciliters/gram using a 60/40 phenol/tetrachloroethane solvent solution at 25° C.

During the esterification or transesterification step, conventional temperatures and catalysts as well as conventional amounts of the catalysts can be utilized. For example, the temperature will range from about 180° C. up to about 300° C., with a preferred range being from about 180° to about 280° C. Following completion of the esterification or transesterification reaction, the low molecular weight oligomer produced is subjected to polycondensation which is carried out at temperatures ranging from about 220° C. to about 280° C., and under a high vacuum, that is less than 1.0 mm of mercury and preferably less than 0.5 mm of mercury. Conventional catalysts for the esterification stage include compounds of zinc, magnesium, calcium, manganese, lead, and titanium-containing compounds. That is, effective catalytic amounts of transition metal compounds, alkaline earth metal compounds, or alkali metal compounds with the acetates, oxides, phenoxides, and alkoxides thereof can be utilized. Specific examples include zinc acetate, maganese acetate, calcium acetate, titanium alkoxides, e.g., titanium tetrabutoxides, and the like. Suitable polycondensation catalysts include antimony acetate, antimony trioxide, antimony pentoxide, titanium alkoxide, organotin oxides, e.g., stannous alkoxides, and the like. Conventional amounts of catalysts range from about $10^{-5}$ to about $10^{-3}$ moles of catalysts per mole of total acid or ester utilized.

The polyisophthalates produced according to the present invention or the copolymers thereof generally have an inherent viscosity greater than 0.4 and desirably greater than 0.5.

The polyisophthalate or copolymer thereof suitable for use in the present invention has a glass transition temperature (Tg) of 70° C. or less, which is lower than the 72° C. glass transition temperature of PET. Generally, the permeability of a polyester resin is inversely proportional to its Tg. Thus, it would be expected that PI, or copolymers thereof, would have a higher permeability than PET. However, unexpectedly, it has been found that improved permeability resistance is obtained utilizing such low Tg resins. Thus, the oxygen permeability resistance of the PI material or copolymers thereof is generally less than 8 cc·mil/100 in$^2$·day·atm, desirably less than 7, preferably less than 5, and from about 1 to about 5 when used in connection with any alcoholic beverage container, e.g., a bottle. The permeability of carbon dioxide is generally 50 or less, desirably 30 or less and preferably 20 or less. These results relate to an unoriented pressed polyester film. Generally, smaller containers will require a higher permeability resistance than larger containers due to the greater surface area to volume ratio.

The polyisophthalates, e.g., poly(ethylene isophthalate), or copolymers thereof made according to the present invention are particularly suitable for use as packaging material, be it in the form of a molded container, a film, or the like. They thus find suitable use as molded containers which are generally clear and may be filled with comestibles, for example, food stuffs, as containers which can be blow-molded and used for carbonated beverages, for example, soft drinks, various juice drinks, for example, orange juice, grape juice, etc., as medicine bottles, or as films to envelope various items, i.e., wrap, such as meat, groceries, and the like. A particular use is in the form of containers for various alcoholic beverages such as beer, wine, liquor, and the like. The storage or bottling of these items is particularly suitable utilizing the packaging material of the present invention due to its relatively low permeability with regard to oxygen and carbon dioxide. These items, and especially beer or champagne, tend to go flat upon loss of carbonation, that is migration of carbon dioxide out of the container. Additionally, migration or permeation of oxygen into the container quickly affects the taste of beer, as well as wine, champagne, and liquor.

Because of the lower glass transition temperature, PI or PEI and copolymers thereof can be processed at lower temperatures than can PET. Processing at these lower temperatures, that is generally less than 500° F. and often less than 450° F. versus about 540° F. for the processing of poly(ethylene terephthalate) as in forming a parison for making a bottle, has several advantages. Lower processing temperatures result in less side reaction of the polyester resin resulting in undesirable by-products, such as linear and cyclic oligomers and particularly acetaldehyde. By comparison, PET containers having small quantities of acetaldehyde may impart an undesirable taste to food stuffs. Also, the flavor of liquor, wine, and beer is particularly affected. Lower processing temperatures have the additional advantages of lower processing cost due to lower energy consumption. Moreover, PEI or PI, or copolymers thereof as packaging material has relatively good properties, approaching those of PET. Hence, it can be readily blow-molded. Although PI or PEI and copolymers thereof are largely amphorous, they exhibit properties approaching that of PET when they are oriented in both directions, that is biaxially oriented. Such orientation is well known to the art and can be achieved in any of several methods, for example as through biaxially oriented blow-molding, commonly used in formation of bottles, and other containers, as well as biaxial orientation currently utilized in the formation of films. In addition to stronger tensile strength imparted to the packaging material by orientation, it also imparts flexibility to the material.

The invention will be better understood by the following examples which illustrate the preparation of the copolymers and the manufacture of the containers described herein.

The following examples illustrate the present invention. In the examples and tables which follow, the following definition of terms will apply:

I.V. is intrinsic viscosity measured at 30° C. using a solution of polymer dissolved in a mixture of 3 weight parts of phenol and 2 weight parts of tetrachloroethane;

Tg is the glass transition temperature in °C. of amorphous samples measured with a Differential Scanning Calorimeter; and $P(O_2)$ is the oxygen permeability measured on an Ox-Tran 100 instrument and reported in cc·mil/100 in$^2$·day·atm.

The compositions listed in the tables are molar percentages based on feed stock.

EXAMPLE 1

Poly(ethylene isophthalate) (PEI) was prepared in the following manner. A small glass reactor tube was charged with 70 grams of dimethyl isophthalate (DMI), about 50 grams of ethylene glycol (EG), 0.0236 gram of manganese acetate and 0.0176 gram of antimony trioxide. This mixture was heated from 180° C. to 225° C. over a four hour period during which a total of 28 milliliters of methanol distilled from the reaction mixture. The temperature was then raised to 240° C. and held there for about 45 minutes during which time additional methanol was removed. A vacuum of about 0.5 mm HG was then applied and the reactants heated to between about 270° C. to about 280° C. with the ethylene glycol being removed. After about 4 hours at the latter temperature and 0.5 mm Hg, a polymer was obtained having an intrinsic viscosity of 0.71. Amorphous films were pressed from this polymer at about 480° F. The glass transition temperature (Tg) of this polymer and the oxygen permeability of the film are given in Table I.

EXAMPLES 2 AND 3

Following the procedure of Example 1, two linear random copolyesters were prepared. In these examples, a portion of the DMI was replaced with dimethyl terephthalate (DMT). The molar charge ratio of DMI to DMT was 85:15 for one polyester and 75:25 for the other. These polymers were pressed into clear films at a temperature of about 480° F. Polymer and film characterization data are shown in Table I.

EXAMPLE 4

Following the procedure of Example 1, a random linear copolyester was prepared from a charge of 60 grams of DMI, 13.2 grams of dimethyl 2,6-naphthalenedicarboxylate and 50 grams of EG. For catalytic purposes, included were 0.0252 gram of zinc acetate and 0.0176 gram of antimony trioxide. Polymer and film characterization data are shown in Table I.

EXAMPLE 5

In this example, a linear random copolyester was prepared from a mixture of reactants consisting of 56.8 grams of isophthalic acid (IPA), 3.4 grams of azelaic acid and 3.4 grams of EG. The charge also included 60 ppm of titanium (as tetrabutyl titanate), based on the weight of the charge, as catalyst. The esterification reaction was completed in about 3 hours at 180° C. to 220° C. with water being distilled from the reaction.

The clear, low molecular weight oligomeric product was then subjected to polycondensation in a manner as described in Example 1, using temperature ranging from 240° C. to 260° C. and 0.5 mm Hg pressure. Films of the polymer were pressed at about 440° F. Polymer and film data are shown in Table I.

EXAMPLE 6

Following the procedure of Example 5, a random linear copolyester was prepared from a mixture of reactants consisting of 56.8 grams of IPA, 10.3 grams of dimer acid (Empol 1010 from Emery Industries, Inc.), and 50 grams of EG. For catalytic purposes, 0.0352 gram of antimony trioxide was added at the beginning of the polycondensation reaction. The polymer obtained in this reaction exhibited a relatively low Tg (37° C.) but still maintained excellent $O_2$ barrier properties (Table 1).

TABLE I

| | ACID MODIFIED PEI | | | | | | | |
|---|---|---|---|---|---|---|---|---|
| | Acid Ratio (mole %) | | | | | | | |
| EXAMPLE | I | T | A | 2,6 ND | DA | I.V. | Tg | $P(O_2)$ |
| 1 | 100 | 0 | 0 | 0 | 0 | 0.71 | 61 | 3.7 |
| 2 | 85 | 15 | 0 | 0 | 0 | 0.62 | 62 | 6.4 |
| 3 | 75 | 25 | 0 | 0 | 0 | 0.70 | 64 | 4.9 |
| 4 | 85 | 0 | 0 | 15 | 0 | 0.62 | 67 | 3.3 |
| 5 | 95 | 0 | 5 | 0 | 0 | 0.48 | 56 | 5.3 |
| 6 | 95 | 0 | 0 | 0 | 5 | 0.60 | 37 | 6.7 |

I = isophthalate
T = terephthalate
A = azelate
2,6 ND = 2,6-naphthalene dicarboxylate
DA = dimer acid

EXAMPLES 7 AND 8

Following the procedure of Example 1, two linear random copolyesters were prepared. In these examples, a portion of the EG was replaced with tetramethylene glycol (TMG). The initial molar charge ratio of EG to TMG was 90:10 for one polyester and 80:20 for the other. The reaction was catalyzed with 60 ppm titanium (TBT). Clear films of these polymers were pressed at 500° F. Polymer and film data are given in Table II.

EXAMPLES 9 AND 10

Following the procedure of Example 1, two linear random copolyesters were prepared by replacing a portion of the EG with cyclohexanedimethanol (CHDM) containing 70 percent trans-isomer. The initial molar charge ratio of EG to CHDM was 95:5 for one polyester and 90:10 for the other. The reactant charge also included 0.25 gram of zinc acetate and 0.0176 gram of antimony trioxide as catalysts. Polymer and film data are given in Table II.

TABLE II

| | GLYCOL MODIFIED PEI | | | | | |
|---|---|---|---|---|---|---|
| | Initial Glycol Ratio (mole %) | | | | | |
| EXAMPLE | EG | TMG | CHDM | I.V. | Tg | $P(O_2)$ |
| 7 | 90 | 10 | 0 | 0.62 | 52 | 3.4 |
| 8 | 80 | 20 | 0 | 0.59 | 48 | 4.6 |
| 9 | 95 | 0 | 5 | 0.48 | 59 | 3.4 |
| 10 | 90 | 0 | 10 | 0.53 | 67 | 4.3 |

EG = ethylene glycol
TMG = tetramethylene glycol
CHDM = cyclohexanedimethanol

EXAMPLE 11

A stainless steel reactor was charged with 4.0 pounds of DMI, 2.85 pounds of EG and 2.6 milliliters of a 6 percent solution of manganese octanoate in mineral spirits. This mixture was heated from 183° to 220° C. over a 2.5 hour period during which a total of 730 milliliters of methanol was distilled from the reaction mixture. The mixture was then transferred to a stainless steel polymerization vessel and 0.456 gram of antimony trioxide was added. The reaction temperature was raised from 220° to 234° C. over a one hour period. Then the pressure in the system was gradually reduced over the next hour to about 1 millimeter Hg while the temperature was being raised to 265° C. During the next two hours, the temperature was gradually increased from 265° to 280° C. The reactor was then restored to atmospheric pressure by passing nitrogen gas into the system. The polymer was extruded from the reactor under slight nitrogen pressure and pelletized. It had an intrinsic viscosity of 0.68.

This polymer was processed on a one-inch extruder at 480° F. to form a transparent 5 mil film. This film exhibited an oxygen permeability of 3.5 cc·mil/100 in.-$^2$·day·atm and an intrinsic viscosity of 0.65. By comparison, poly(ethylene terephthalate) (PET) requires a processing temperature in the 530° to 550° F. range and exhibits an extruded film oxygen permeability in the 7-9 cc·mil/100 in$^2$·day·atm range.

EXAMPLE 12

Following the procedure of Example 11, a linear random copolyester was prepared from a molar charge composition consisting of ethylene glycol/tetramethylene glycol/isophthalate acid/terephthalic acid of 75/25/75/25. Tetrabutyl titanate (60 ppm) was used as a catalyst. A polymer having an intrinsic viscosity of 0.68 and a Tg of 61° C. was obtained. A pressed film of this polymer exhibited an oxygen permeability of 7.4 cc·mil/100 in$^2$·day·atm.

This polymer was injection molded at a cylinder temperature of 480° F. to form clear test cluster samples. The intrinsic viscosity of the polymer after molding was 0.62. By comparison, PET requires a cylinder temperature of about 540° F. for injection molding.

EXAMPLE 13

In this example, acetaldehyde generation rate data is given for poly(ethylene isophthalate) PEI and a 75/25 ethylene isophthalate-ethylene terephthalate copolyester (EI/T). These data were obtained by gas chromatographic analysis after heating the polyester chips at the designated temperature for varying times.

TABLE II

| POLYMER | Acetaldehyde Generation Rate (ppm/min.) | | |
|---|---|---|---|
| | 500° F. | 468° F. | 446° F. |
| PEI | 1.07 | 0.64 | 0.62 |
| EI/T | 1.72 | 0.57 | 0.40 |

These data indicate the trend towards higher acetaldehyde generation at higher polyester processing temperatures. The temperatures employed in this study represent a typical processing temperature range for the polymers described in this invention. By comparison, PET is normally processed at temperatures well above 500° F.

While in accordance with the patent statutes, the best mode and preferred embodiment has been set forth, it will be apparent to those skilled in the art that various changes and modifications can be made without departing from the spirit or scope of the invention. Accordingly, the invention is measured by the scope of the attached claims.

What is claimed is:

1. As a composition of matter, a polyester suitable for use as a packaging material, comprising:
    polyisophthalates or copolymers thereof having a glass transition temperature of 70° C. or less;
    said polyisophthalates being the reaction product of an isophthalic compound and a diol having from 2 to 12 carbon atoms, said isophthalic compound selected from the group consisting of isophthalic acid, an alkyl ester of isophthalic acid having from 10 to 20 carbon atoms, said diol being ethylene glycol and containing from 0 to 60 mole percent of one or more compounds selected from the group consisting of a diol having from 3 to 12 carbon atoms, a glycol ether having from 4 to 12 carbon atoms, and combinations thereof;
    said copolymer being the reaction product of said isophthalic compound, said diol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound.

2. A composition of matter according to claim 1, wherein said polyester has an oxygen permeability of less than 8 cc·mil/100 in$^2$·day·atm, and a $CO_2$ permeability of less than 50 cc·mil/100 in$^2$·day·atm.

3. A composition of matter according to claim 2, wherein said polyester has an intrinsic viscosity greater than 0.4 dl/g.

4. A composition of matter according to claim 3, wherein said isophthalic compound is selected from the group consisting of isophthalic acid, and an alkyl ester of isophthalic acid having from 10 to 16 carbon atoms,
    wherein said dicarboxylic acid is selected from the group consisting of an alkyl dicarboxylic acid having from 4 to 12 carbon atoms, an aryl or alkyl substituted aryl dicarboxylic acid having from 8 or 9, respectively, to 16 carbon atoms, a dimer acid having from 34 to 40 carbon atoms, and combinations thereof, wherein said dicarboxylic ester is an alkyl diester having from 6 to 20 carbon atoms, an alkyl substituted aryl diester or an aryl diester of a dicarboxylic acid having from 11 or 10 respectively to 20 carbon atoms, or an alkali salt of sulfo dialkyl isophthalate,
    wherein the amount of said dicarboxylic acid or ester thereof is from about 0 to about 20 mole percent when said acid is said alkyl acid or said dimer acid, and from about 0 to about 30 mole percent when said diacid compound is said aryl acid, said alkyl substituted aryl acid, said alkyl diester, said aryl diester, said alkyl substituted aryl diester, or said sulfo dialkyl isophthalate, and
    wherein the amount of said diol other than said ethylene glycol is 45 mole percent or less, wherein said diol has from 3 to 10 carbon atoms, and wherein said glycol ether has from 4 to 8 carbon atoms.

5. A composition of matter according to claim 4, wherein said intrinsic viscosity is greater than 0.5 dl/g.

6. A composition of matter according to claim 5, wherein said isophthalic compound is selected from the group consisting of isophthalic acid, dimethyl isophthalate, and diethyl isophthalate,
wherein said dicarboxylic acid is terephthalic acid, and wherein said dicarboxylic ester is dimethyl terephthalate, and
wherein said diol other than said ethylene glycol is a diol having from 3 to 8 carbon atoms and wherein said amount is less than 30 mole percent.

7. A composition of matter according to claim 5, wherein said isophthalic compound is selected from the group consisting of isophthalic acid, dimethyl isophthalate, and diethyl isophthalate,
wherein said diol other than said ethylene glycol is a diol selected from the group consisting of cyclohexanedimethylol, tetramethylene glycol, and propylene glycol, wherein the amount of said glycol is 30 mole percent or less, and
wherein said dicarboxylic acid is selected from the group consisting of terephthalic acid, and said dimer acid having 36 carbon atoms, and wherein said dicarboxylic acid is selected from the group consisting of dimethyl terephthalate, azelate, and 2,6-naphthalene dicarboxylate, the amount of said acid or ester being 20 mole percent or less.

8. A composition of matter according to claim 6, wherein said polyester resin has an oxygen permeability of 5 or less, a carbon dioxide permeability of 20 or less, and wherein said copolyester resin is a random linear copolyester.

9. A composition of matter according to claim 8, wherein said isophthalic compound is isophthalic acid, wherein said diol is ethylene glycol, wherein said dicarboxylic acid is terephthalic acid.

10. A composition of matter according to claim 9, wherein said packaging material is poly(ethylene isophthalate).

11. A composition of matter according to claim 1, 3, 4, 6, 7, 8, 9, or 10, wherein said resin is suitable for making a bottle.

12. A composition of matter according to claim 11, wherein said resin is suitable for making a beverage bottle.

13. A composition of matter according to claim 11, wherein said resin is suitable for making a beer bottle.

14. A composition of matter according to claim 1, 3, 4, 6, 7, 8, 9, or 10, wherein said resin is suitable for making a film.

15. A molded container formed from materials which comprise polyisophthalates or copolymers thereof,
said polyisophthalates being the reaction product of an isophthalic compound, and a diol having from 2 to 12 carbon atoms, said isophthalic compound selected from the group consisting of isophthalic acid, and an alkyl ester of isophthalic acid containing from 10 to 20 carbon atoms, said diol being ethylene glycol and containing from 0 up to 60 mole percent of one or more compounds selected from the group consisting of a diol having from 3 to 12 carbon atoms, a glycol ether having from 4 to 12 carbon atoms, and combinations thereof,
said copolymer additionally including up to 50 mole percent of a dicarboxylic acid or ester thereof having from 4 to 40 carbon atoms based upon said isophthalic compound and said dicarboxylic acid or ester thereof, said dicarboxylic acid or ester thereof being other than said isophthalic compound.

16. A molded container according to claim 15, wherein said polyester has an oxygen permeability of less than 8 cc·mil/100 in$^2$·day·atm and a $CO_2$ permeability of less than 50 cc·mil/100 in$^2$·day·atm, and an intrinsic viscosity of greater than 0.4 dl/g.

17. A molded container according to claim 16, wherein said isophthalic compound is selected from the group consisting of isophthalic acid, an alkyl ester of isophthalic acid having from 10 to 16 carbon atoms,
wherein said dicarboxylic acid or ester thereof is selected from the group consisting of an alkyl dicarboxylic acid having from 4 to 12 carbon atoms, an aryl or an alkyl substituted aryl dicarboxylic acid having from 8 or 9, respectively, to 16 carbon atoms, a dimer acid having from 34 to 40 carbon atoms, an alkyl diester having from 6 to 20 carbon atoms, an alkyl substituted aryl diester or an aryl diester having from 11 or 10 respectively to 20 carbon atoms, or an alkali salt of sulfo dialkyl isophthalate, and
wherein the amount of said dicarboxylic acid or ester thereof is from 0 to 20 mole percent when said acid is said alkyl acid or said dimer acid, and from 0 to 30 mole percent when said acid or ester thereof is said aryl acid, said alkyl substituted aryl acid, said alkyl diester, said aryl diester, or said alkyl substituted aryl diester, or said sulfo dialkyl isophthalate, and
wherein the amount of said non-ethylene glycol and said glycol ether is 45 mole percent or less and wherein said diol has from 3 to 10 carbon atoms, and wherein said glycol ether has from 4 to 8 carbon atoms.

18. A molded container according to claim 17, wherein said oxygen permeability is less than 7, wherein said carbon dioxide permeability is 30 or less, and wherein the intrinsic viscosity is greater than 0.5 dl/g.

19. A molded container according to claim 18, wherein said isophthalic compound is selected from the group consisting of isophthalic acid, dimethyl isophthalate, and diethyl isophthalate, wherein said diol other than said non-ethylene glycol is a diol having from 3 to 8 carbon atoms, and wherein said amount is 30 mole percent or less,
wherein said dicarboxylic acid is terephthalic acid, and wherein said dicarboxylic ester is dimethyl terephthalate.

20. A molded container according to claim 18, wherein said isophthalic compound is selected from the group consisting of isophthalic acid, dimethyl isophthalate, and diethyl isophthalate,
wherein said diol other than said ethylene glycol is a diol selected from the group consisting of cyclohexanedimethanol, tetramethylene glycol, and propylene glycol, wherein the amount of said glycol is 30 mole percent or less, and
wherein said dicarboxylic acid is selected from the group consisting of terephthalic acid, and said dimer acid having 36 carbon atoms, and wherein said dicarboxylic acid is selected from the group consisting of dimethyl terephthalate, azelate, and 2,6-naphthalene dicarboxylate, the amount of said acid or ester being 20 mole percent or less.

21. A molded container according to claim 19, wherein said oxygen permeability is 5 or less, wherein said carbon dioxide permeability is 20 or less, and wherein said polyester resin is a random linear copolymer.

22. A molded container according to claim 21, wherein said isophthalic compound is isophthalic acid, wherein said diol is ethylene glycol and wherein said dicarboxylic acid is terephthalic acid.

23. A molded container according to claim 22, wherein said molded container is made of poly(ethylene isophthalate).

24. A molded container according to claim 15, 16, 17, 19, 20, 21, 22, or 23, wherein said molded container is for containing a liquid.

25. A molded container according to claim 24, wherein said liquid is an alcoholic beverage.

26. A molded container according to claim 24, wherein said alcoholic beverage is beer.

* * * * *